(12) United States Patent
Branecky (10) Patent No.: US 10,753,648 B2
(45) Date of Patent: *Aug. 25, 2020

(54) WATER HEATER AND METHOD OF OPERATING A WATER HEATER

(71) Applicant: A. O. Smith Corporation, Milwaukee, WI (US)

(72) Inventor: Brian T. Branecky, Oconomowoc, WI (US)

(73) Assignee: A. O. Smith Corporation, Milwaukee, WI (US)

( * ) Notice: Subject to any disclaimer, the term of this patent is extended or adjusted under 35 U.S.C. 154(b) by 796 days.

This patent is subject to a terminal disclaimer.

(21) Appl. No.: 15/206,742

(22) Filed: Jul. 11, 2016

(65) Prior Publication Data

US 2016/0320095 A1 Nov. 3, 2016

Related U.S. Application Data

(63) Continuation of application No. 13/834,929, filed on Mar. 15, 2013, now Pat. No. 9,405,304.

(51) Int. Cl.
*F24H 9/20* (2006.01)
*F24H 1/20* (2006.01)
*G05D 23/19* (2006.01)

(52) U.S. Cl.
CPC .......... *F24H 9/2021* (2013.01); *F24H 1/202* (2013.01); *G05D 23/1923* (2013.01); *G05D 23/1928* (2013.01); *F24H 2250/00* (2013.01)

(58) Field of Classification Search
CPC .... F24H 1/202; F24H 2250/00; F24H 9/2021; G05D 23/1923; G05D 23/1928
See application file for complete search history.

(56) References Cited

U.S. PATENT DOCUMENTS 2,238,624 A 4/1941 Clark
2,307,061 A 1/1943 Morrow
(Continued)

FOREIGN PATENT DOCUMENTS

JP 4194550 7/1992
WO 9410620 5/1994

OTHER PUBLICATIONS

Canadian Patent Office Action for Application No. 2,844,196 dated Aug. 28, 2019 (3 pages).

*Primary Examiner* — Chad G Erdman
(74) *Attorney, Agent, or Firm* — Michael Best and Friedrich LLP (57) ABSTRACT

A water heater including a tank, first and second heating elements, first and second temperature sensors, a communication module, and a controller. The controller is operable to determine a first temperature value related to a first temperature sensed by the first temperature sensor, determine a second temperature value related to a second temperature sensed by the second temperature sensor, and receive a command from the external controller. When the received command is a first command, the controller control current to the first heating element based on the first temperature value traversing a first set point, and controls current to the second heating element based on the second temperature value traversing a second set point. When the received command is a second command, the controller controls current only to the first heating element and not the second heating element, the control being based on the first temperature value.

20 Claims, 3 Drawing Sheets

(56) References Cited

U.S. PATENT DOCUMENTS

| | | |
|---|---|---|
| 3,566,078 A | 2/1971 | Krackow |
| 3,891,817 A | 6/1975 | Brown |
| 3,946,802 A | 3/1976 | Christenson |
| 3,979,060 A | 9/1976 | Tierce |
| 3,989,928 A | 11/1976 | Scragg et al. |
| 4,016,402 A | 4/1977 | Scott |
| 4,023,043 A | 5/1977 | Stevenson |
| 4,052,000 A | 10/1977 | Honikman |
| 4,058,702 A | 11/1977 | Jerles |
| 4,100,428 A | 7/1978 | Delisle et al. |
| 4,150,787 A | 4/1979 | Braathen |
| 4,166,944 A | 9/1979 | Scott |
| 4,170,729 A | 10/1979 | Lane et al. |
| 4,267,432 A | 5/1981 | Kiepe |
| 4,289,954 A | 9/1981 | Brognano et al. |
| 4,305,005 A | 12/1981 | McKenney et al. |
| 4,315,248 A | 2/1982 | Ward |
| 4,317,049 A | 2/1982 | Schweppe |
| 4,317,987 A | 3/1982 | Fieldman |
| 4,324,207 A | 4/1982 | Leuthard |
| 4,333,002 A | 6/1982 | Kozak |
| 4,348,668 A | 9/1982 | Gurr et al. |
| 4,362,949 A | 12/1982 | McKenney et al. |
| 4,370,723 A | 1/1983 | Huffman et al. |
| 4,371,779 A | 2/1983 | Maynard et al. |
| 4,413,775 A | 11/1983 | Scott |
| 4,419,667 A | 12/1983 | Gurr et al. |
| 4,449,178 A | 5/1984 | Blau, Jr. et al. |
| 4,461,949 A | 7/1984 | Weiser |
| 4,467,178 A | 8/1984 | Swindle |
| 4,469,935 A | 9/1984 | Candela |
| 4,474,139 A | 10/1984 | Dobias |
| 4,497,434 A | 2/1985 | Lawless |
| 4,508,261 A | 4/1985 | Blank |
| 4,511,790 A | 4/1985 | Kozak |
| 4,520,259 A | 5/1985 | Schoenberger |
| 4,522,333 A | 6/1985 | Blau, Jr. et al. |
| 4,529,032 A | 7/1985 | Molitor |
| 4,535,931 A | 8/1985 | Bartok et al. |
| 4,568,821 A | 2/1986 | Boe |
| 4,588,875 A | 5/1986 | Kozak et al. |
| 4,620,667 A | 11/1986 | Vandermeyden et al. |
| 4,645,908 A | 2/1987 | Jones |
| 4,700,886 A | 10/1987 | McGhee et al. |
| 4,737,615 A | 4/1988 | Stipe |
| 4,765,351 A | 8/1988 | Clary |
| 4,775,944 A | 10/1988 | Nakamura |
| 4,832,259 A | 5/1989 | Vandermeyden |
| 4,834,284 A | 5/1989 | Vandermeyden |
| 4,935,603 A | 6/1990 | Iwamoto et al. |
| 4,940,079 A | 7/1990 | Best et al. |
| 4,948,948 A | 8/1990 | Lesage |
| 4,998,024 A | 3/1991 | Kirk et al. |
| 5,023,432 A | 6/1991 | Boykin et al. |
| 5,056,712 A | 10/1991 | Enck |
| 5,101,471 A | 3/1992 | Bill |
| 5,103,078 A | 4/1992 | Boykin et al. |
| 5,115,491 A | 5/1992 | Perlman et al. |
| 5,168,170 A | 12/1992 | Hartig |
| 5,193,138 A | 3/1993 | Richey et al. |
| 5,220,807 A | 6/1993 | Bourne et al. |
| 5,244,148 A | 9/1993 | Vandermeyder |
| 5,255,338 A | 10/1993 | Robinson, Jr. et al. |
| 5,289,362 A | 2/1994 | Liebl et al. |
| 5,293,446 A | 3/1994 | Owens et al. |
| 5,317,670 A | 5/1994 | Elia |
| 5,351,712 A | 10/1994 | Houlihan |
| 5,433,379 A | 7/1995 | Harrison |
| 5,442,157 A | 8/1995 | Jackson |
| 5,443,041 A | 8/1995 | Folsom et al. |
| 5,481,140 A | 1/1996 | Maruyama et al. |
| 5,495,551 A | 2/1996 | Robinson, Jr. et al. |
| 5,502,339 A | 3/1996 | Hartig |
| 5,626,287 A | 5/1997 | Krause et al. |
| 5,696,695 A | 12/1997 | Ehlers et al. |
| 5,697,551 A | 12/1997 | Gataora |
| 5,700,993 A | 12/1997 | Counsell et al. |
| 5,761,083 A | 6/1998 | Brown, Jr. et al. |
| 5,797,358 A | 8/1998 | Brandt et al. |
| 5,805,856 A | 9/1998 | Hanson |
| 5,831,250 A | 11/1998 | Bradenbaugh |
| 5,898,818 A | 4/1999 | Chen |
| 5,948,304 A | 9/1999 | Bradenbaugh |
| 5,956,462 A | 9/1999 | Langford |
| 5,968,393 A | 10/1999 | Demaline |
| 6,002,114 A | 12/1999 | Lee |
| 6,137,955 A | 10/2000 | Krell et al. |
| 6,208,806 B1 | 3/2001 | Langford |
| 6,216,956 B1 | 4/2001 | Ehlers et al. |
| 6,293,471 B1 | 9/2001 | Stettin et al. |
| 6,308,009 B1 | 10/2001 | Shellenberger et al. |
| 6,311,091 B1 | 10/2001 | Yamahira |
| 6,332,580 B1 | 12/2001 | Enander et al. |
| 6,350,967 B1 | 2/2002 | Scott |
| 6,363,216 B1 | 3/2002 | Bradenbaugh |
| 6,363,218 B1 | 3/2002 | Lowenstein et al. |
| 6,370,328 B1 | 4/2002 | Mottershead |
| 6,374,046 B1 | 4/2002 | Bradenbaugh |
| 6,375,087 B1 | 4/2002 | Day et al. |
| RE37,745 E | 6/2002 | Brandt et al. |
| 6,455,820 B2 | 9/2002 | Bradenbaugh |
| 6,560,409 B2 | 5/2003 | Troost, IV |
| 6,633,726 B2 | 10/2003 | Bradenbaugh |
| 6,649,881 B2 | 11/2003 | Scott et al. |
| 6,785,466 B1 | 8/2004 | Jackson et al. |
| 6,795,644 B2 | 9/2004 | Bradenbaugh |
| 6,806,446 B1 | 10/2004 | Neale |
| 6,861,621 B2 | 3/2005 | Ghent |
| 6,915,069 B2 | 7/2005 | Bradenbaugh |
| 6,931,204 B2 | 8/2005 | Urata et al. |
| 6,936,798 B2 | 8/2005 | Moreno |
| 6,955,301 B2 | 10/2005 | Munsterhuis et al. |
| 6,957,014 B2 | 10/2005 | Ho |
| 6,989,514 B2 | 1/2006 | Patterson et al. |
| 7,010,363 B2 | 3/2006 | Donnelly et al. |
| 7,015,432 B2 | 3/2006 | Valbh et al. |
| 7,021,073 B2 | 4/2006 | Sakakibara |
| 7,043,149 B2 | 5/2006 | Morimoto et al. |
| 7,043,341 B2 | 5/2006 | Gallupe et al. |
| 7,065,431 B2 | 6/2006 | Patterson et al. |
| 7,257,320 B2 | 8/2007 | Hartge |
| 7,380,522 B2 | 6/2008 | Krell et al. |
| 7,420,293 B2 | 9/2008 | Donnelly et al. |
| 7,432,477 B2 | 10/2008 | Teti |
| 7,516,106 B2 | 4/2009 | Ehlers et al. |
| 7,547,863 B2 | 6/2009 | Hardesty et al. |
| 7,574,120 B2 | 8/2009 | Patterson et al. |
| 7,582,985 B2 | 9/2009 | Murguia |
| 7,603,204 B2 | 10/2009 | Patterson et al. |
| 7,620,302 B2 | 11/2009 | Lesage et al. |
| 7,634,976 B2 | 12/2009 | Gordon et al. |
| 7,644,686 B2 | 1/2010 | Threatt et al. |
| 7,653,443 B2 | 1/2010 | Flohr |
| 7,672,751 B2 | 3/2010 | Patterson et al. |
| 7,712,677 B1 | 5/2010 | Munsterhuis et al. |
| 7,744,008 B2 | 6/2010 | Chapman, Jr. et al. |
| 7,856,835 B2 | 12/2010 | Ida |
| 7,860,380 B2 | 12/2010 | Eisenbraun |
| 7,881,831 B2 | 2/2011 | Patterson et al. |
| 7,917,252 B2 | 3/2011 | Imagawa et al. |
| 7,925,597 B2 | 4/2011 | Takano et al. |
| 7,962,248 B2 | 6/2011 | Flohr |
| 7,965,929 B2 | 6/2011 | Eberle |
| 7,971,796 B2 | 7/2011 | Rogues |
| 8,010,812 B2 | 8/2011 | Forbes, Jr. et al. |
| 8,111,980 B2 | 2/2012 | Bradenbaugh |
| 8,165,726 B2 | 4/2012 | Nordberg et al. |
| 8,183,995 B2 | 5/2012 | Wang et al. |
| 8,191,513 B2 | 6/2012 | Krause et al. |
| 8,204,633 B2 | 6/2012 | Harbin, III et al. |
| 8,232,508 B1 | 7/2012 | Milligan |
| 8,285,129 B2 | 10/2012 | Kim et al. |
| 2004/0075343 A1 | 4/2004 | Wareham et al. |
| 2004/0117330 A1 | 6/2004 | Ehlers et al. |

(56) References Cited

U.S. PATENT DOCUMENTS

| | | |
|---|---|---|
| 2007/0043478 A1* | 2/2007 | Ehlers .................... F24F 11/30 |
| | | 700/276 |
| 2007/0175883 A1* | 8/2007 | Miu ..................... F24H 9/2021 |
| | | 219/400 |
| 2007/0205915 A1 | 9/2007 | Shuey et al. |
| 2008/0133065 A1 | 6/2008 | Cannon et al. |
| 2008/0205865 A1 | 8/2008 | Lesage et al. |
| 2008/0314337 A1 | 12/2008 | Teti |
| 2008/0314999 A1* | 12/2008 | Strand ................ G05D 23/1919 |
| | | 236/20 R |
| 2009/0105888 A1* | 4/2009 | Flohr .................... G06Q 30/00 |
| | | 700/295 |
| 2009/0317068 A1 | 12/2009 | Yeung |
| 2010/0004790 A1* | 1/2010 | Harbin, III .......... F24D 19/1051 |
| | | 700/291 |
| 2010/0179705 A1* | 7/2010 | Flohr ................. H02J 13/0006 |
| | | 700/295 |
| 2010/0206869 A1 | 8/2010 | Nelson et al. |
| 2011/0058795 A1* | 3/2011 | Kleman ............... F24H 9/2021 |
| | | 392/308 |
| 2011/0081134 A1 | 4/2011 | Salyer |
| 2011/0095010 A1 | 4/2011 | Bondarowicz et al. |
| 2011/0123179 A1* | 5/2011 | Roetker .............. F24D 17/0031 |
| | | 392/441 |
| 2012/0051725 A1 | 3/2012 | Chen |
| 2012/0065798 A1 | 3/2012 | Finch et al. |
| 2012/0080420 A1 | 4/2012 | Hui et al. |
| 2012/0097746 A1 | 4/2012 | Haws |
| 2013/0220591 A1* | 8/2013 | Hayashida ........... F25B 27/002 |
| | | 165/287 |

\* cited by examiner

WATER HEATER AND METHOD OF OPERATING A WATER HEATER

RELATED APPLICATIONS

This application is a continuation of U.S. patent application Ser. No. 13/834,929 filed on Mar. 15, 2013, the entire contents of which are incorporated herein by reference.

BACKGROUND

Utility companies (electric utility now, natural gas utility in the future) would like to regulate a water heater's load to avoid peak draws in power by spreading over time the energy required to heat the water. There are several commands that the utilities would like to use. Commands like shed (or reduce) load, add load, relative pricing (static or dynamic), or grid guidance. The invention relates to using these commands to mange water temperature and user satisfaction while at the same time shifting the energy to heat the tank to off-peak hours.

SUMMARY

In one embodiment, the invention provides a method of operating a water heater to be placed at a consumer location and to be in communication with an external controller. The water heater includes a tank for holding water, a first heating element extending into the tank, a second heating element extending into the tank, a first temperature sensor coupled to the tank, and a second temperature sensor coupled to the tank. The method includes sensing a first temperature with the first temperature sensor, determining a first temperature value related to the first temperature, sensing a second temperature with the second temperature sensor, determining a second temperature value related to the second temperature, and receiving a command from the external controller. The method further includes, when the received command is a first command, controlling current to the first heating element based on the first temperature value traversing a first set point, and controlling current to the second heating element based on the second temperature value traversing a second set point. The method also includes, when the received command is a second command, controlling current only to the first heating element and not the second heating element, the controlling being based on the first temperature value.

In another embodiment, the invention provides another method of operating a water heater to be placed at a consumer location and to be in communication with an external controller. The method includes sensing a temperature with a temperature sensor, determining a temperature value related to the temperature, and receiving a command and a ratio from an external controller. The method further includes, when the received command is a first command, providing a plurality of slot time periods, providing a random number, which is limited by the number of the plurality of slot time periods, controlling a heat source under a first strategy for a first group of slot time periods based on the random number and the ratio, and controlling the heat source under a second strategy for a second group of slot time periods based on the random number and the ratio.

In yet another embodiment, the invention provides a water heater for performing the methods of operation. The water heater includes a tank for holding water, a first heating element extending into the tank, a second heating element extending into the tank, a first temperature sensor thermally coupled to the water, a second temperature sensor thermally coupled to the water, a communication module operable to communicate with an external controller remote from the water heater, and a controller including a processor and a computer readable memory storing instructions that, when executed by the processor, cause the controller to operate the water heaters.

Other aspects of the invention will become apparent by consideration of the detailed description and accompanying drawings.

DETAILED DESCRIPTION

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways.

Figure 1:
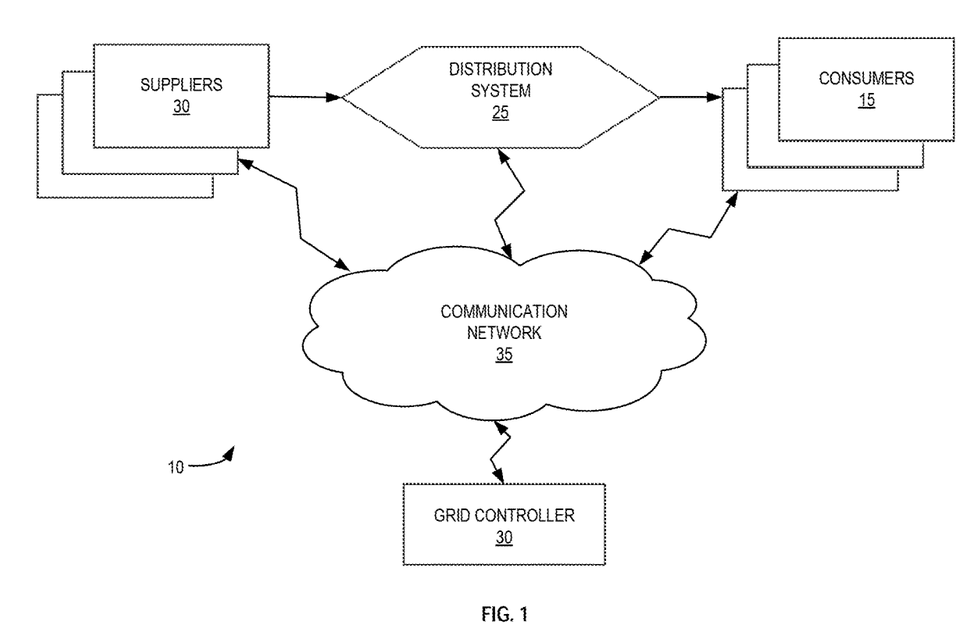
FIG. 1 schematically represents an energy management system incorporating aspects of the invention.

FIG. 1 schematically represents an energy management system 10 with a plurality of consumers 15 receiving electrical energy from one or more suppliers 20 via a distribution system 25. The one or more suppliers 20 may be a public electric utility or a natural gas utility, the distribution system 25 may be an electrical power grid or a gas distribution system, and the consumers 15 may be residences, businesses, or energy-usage devices of the residences or businesses.

A grid controller 30 can receive information from one or more of the suppliers 20, distribution system 25, and consumers 15, and control the distribution of energy (e.g., electrical energy or natural gas) from the suppliers 20 to the consumers 15 based on the received information. The communication of the information is via a communication network 35. The communication network 35 may be a network or multiple networks made up of hardware, software, or both, such as the Internet, telephone, Ethernet, analog cellular, digital cellular, short range radio wireless, Zigbee, HomePlug, Wifi, WMax, broadband over power line, coaxial cable, and the like. The grid controller 30 is typically referred to as a smart grid controller and the energy management system 10 shown in FIG. 1 is typically referred to as a smart grid. The grid controller 30 is typically one or more computers adapted to and responsible for coordinating and controlling the smart grid (i.e., commanding the distribution of electrical energy from the suppliers to the consumers and even the consumer loads).

The description thus far with FIG. 1 is a general description of a smart grid and is intended to be generic. It is envisioned that the improvements discussed and claimed herein can be used with many smart grid arrangements, and the discussed structural arrangements for FIG. 1 are not intended to be a limitation on the invention. The grid controller 30 is in communication with thousands or even millions of consumers and consumer loads 15. The grid controller 30 has very sophisticated databases and analysis and control algorithms that monitor real time load and capacity information as well as expected patterns and other prediction information such as weather and planned construction interruptions. Again, why or how the grid controller 30 controls the smart grid 10 is inconsequential for the invention. Rather, what is relevant is that the grid controller issues commands to consumers and/or their loads 15. Further information regarding various commands is provided herein. The grid controller 30 may be owned and operated by the company or utility that owns and operates the suppliers 20 and/or distribution system 25. Alternatively, multiple organizations and/or agencies may divide the work and responsibility of operating various parts of the energy delivery and load control system.

Figure 2:
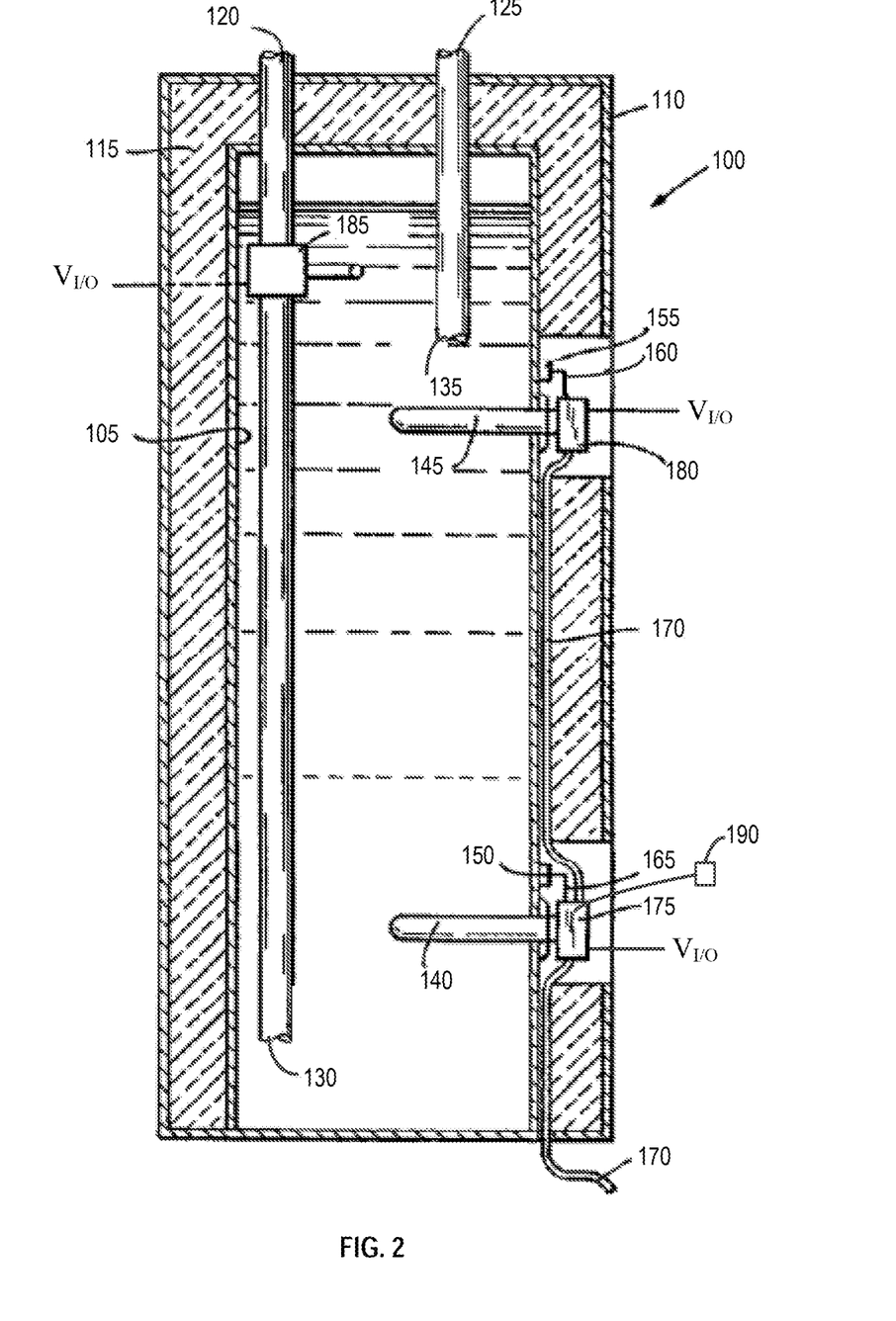
FIG. 2 is a sectional view of a water heater capable of being used in the system of FIG. 1.

One common load for a consumer 15 is a storage-type water heater. An exemplary electrical storage-type water heater 100 incorporating aspects of the invention is shown in FIG. 2; however, the invention may be applicable to a gas storage-type water heater. The water heater 100 includes a permanently enclosed water tank 105, a shell 110 surrounding the water tank 105, and foam insulation 115 filling the annular space between the water tank 105 and shell 110. A water inlet line or dip tube 120 and a water outlet line 125 enter the top of the water tank 105. The water inlet line 120 has an inlet opening 130 for adding cold water near the bottom of the water tank 105. The water outlet line 125 has an outlet opening 135 for withdrawing hot water from near the top of the water tank 105. Multiple resistance heating elements 140 and 145 extend through the wall of the water tank 105. In alternative to the heating elements 140 and 145, the water heater 100 can include a gas burner or a combination of an electric heating element and a gas burner. Each of the electric heating element and the gas burner can be referred to generically as a heat source. The below discussion regarding the water heater 100 and the operations of the water heater 100 will be directed to a heater having multiple resistance heating elements. However, the discussion below can be extended to a gas storage-type water heater or a mix source storage-type water heater.

Referring again to FIG. 2, multiple temperature sensors 150 and 155 are thermodynamically coupled with the outer wall of water tank 105 for indirectly sensing the temperature of water in the water tank 105. The temperature sensors 150 and 155 are connected to element control boxes 175 and 180 by electrical wire 160 and 165, respectively. Electric A.C. power is supplied to the heating elements 140 and 145 through line 170. Activation/deactivation of each heating element 140 and 145 is controlled, in part, by respective relays that receive control signals. A user interface may be mounted on the outside of the water heater 100 to permit communication with a control box and provides security protected access for control of the heating elements 140 and 145. The user interface may be operable to provide direct or remote control of the water heater 100. The control box can control the heating elements 140 and 145 by providing a control signal on signal lines $V_{I/O}$. The control box can be distinct from the user interface and element boxes 175 and 180, can be incorporated with the user interface, or can be incorporated in one of the element boxes 175 and 180. It is also envisioned that the control box, the user interface, and the element boxes can be combined in one unit or box.

For the construction shown in FIG. 2, heating element 140 is located in the lower portion of the tank 105 and heating element 145 is located in the upper portion of the tank 105. Communication and control among the sensors 150 and 155 with the control box is accomplished through a communication link. Control circuitry in the control box might take the form of a programmable device as discussed further below. It is envisioned that more than two heating elements and/or two temperature sensors could be installed as part of the water heater 100, if desired. Regardless of the exact control circuitry used, or whether a single control box or multiple control boxes are implemented, the heating elements 140 and 145 in FIG. 2 are individually controlled. Moreover, feedback mechanisms employing the temperature sensors 150 and 155 may be used to trigger activation of the heating elements 140 and 145.

As part of the water heater, a mixing valve 185 may be used. The valve 185 may be controlled through a communication link $V_{I/O}$ coupled to the control box. Thus, for example, if overheated water is sensed by a temperature sensor, such as sensor 155, then cold water may be introduced into the overheated water. Alternatively, the mixing valve 185 may be coupled in the output conduit 125 of the water heater 110.

The water heater 100 may include an ambient or room temperature sensor 190. The ambient temperature sensor 190 is located external to the water heater 100, but is located within the surrounding environment of the water heater 100 and senses the temperature of the surrounding environment of the water heater 100. Of course, the water heater 100 may include additional temperature sensors, may include other sensors (e.g., a water consistency sensor), and may include other electrical components (e.g., a powered anode).

Before proceeding further, uneven heating often occurs in storage-type water heaters. Uneven heating results in the creation of "stacking" or "stratification" where water that is heated rises to the top of the tank. Generally, warmer water is less dense and, therefore, rises. Thus, the temperature of the water within the tank 105 generally increases in the positive y-direction with warm water at the bottom and hot water at the top. As a result, non-uniform temperature strata are formed within the tank 105. The stacking effect is exacerbated with the introduction of cold water through the water inlet line 120.

Figure 3:
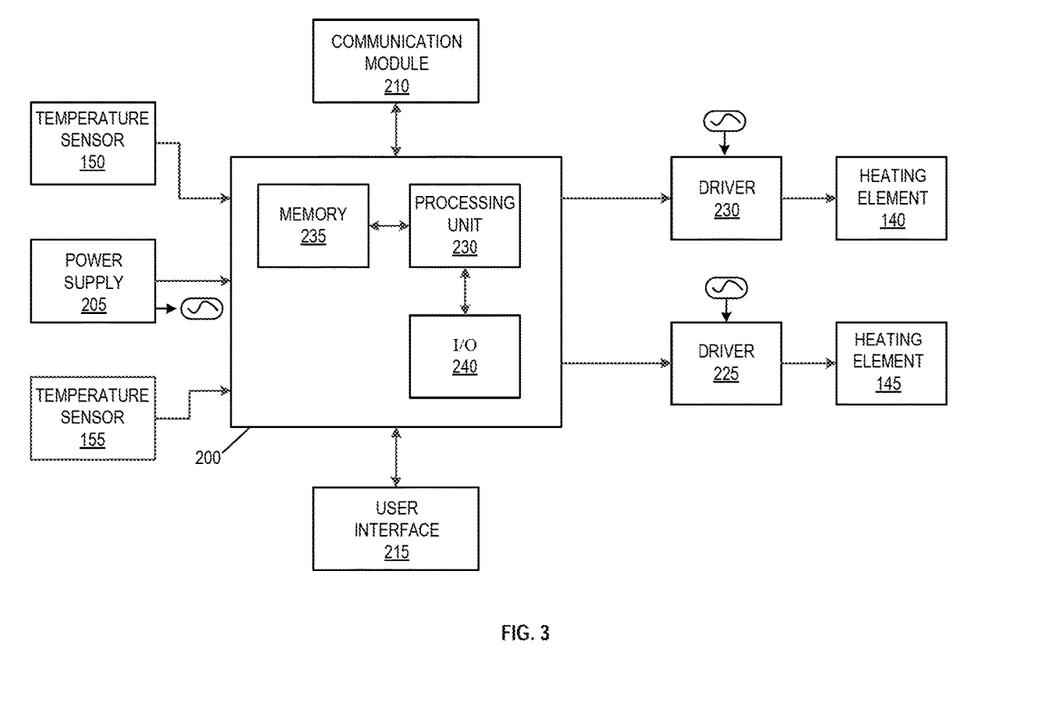
FIG. 3 is a block diagram of portions of the control circuit for the water heater of FIG. 2.

Referring now to FIG. 3, the water heater 100 includes a controller 200 electrically connected to the first and second heating elements 140 and 145, and the first and second water temperature sensors 150 and 155. The controller 200 is also connected to power supply 205, communication module 210, user interface 215, and drivers 220 and 225. The controller 200 may also be connected to other electrical elements of the water heater 100 such as the ambient temperature sensor 190 and a powered anode. As discussed above, the various elements shown in FIG. 3 can be housed in, supported by, or coupled to one or more control boxes.

In general terms, the controller 200 receives alternating current (AC) (e.g., 220 Volts AC) from power line 170; modulates or controllably provides the voltage to the first and second heating elements 140 and 145 via drivers 220 and 225, respectively; and receives first and second temperature signals from the first and second temperature sensors 150 and 155 to control the heating elements 140 and 145. The controller 200 also receives commands and command information from a user via the user interface 215 and an external controller via the communication module 210. The external controller can be the grid controller 30 or a house controller (sometimes referred to as a "smart house" controller).

The controller 200 includes combinations of software and hardware. In one construction, the controller 200 includes a printed circuit board ("PCB") that is populated with a plurality of electrical and electronic components that provide power, operational control, and protection to the water heater 100. In some constructions, the PCB includes, for example, a processing unit 230 (e.g., a microprocessor, a microcontroller, or another suitable programmable device or combination of programmable devices), a memory 235, and a bus. The bus connects various components of the PCB, including the memory 235, to the processing unit 230. The memory 235 includes, for example, a read-only memory ("ROM"), a random access memory ("RAM"), an electrically erasable programmable read-only memory ("EEPROM"), a flash memory, a hard disk, or another suitable magnetic, optical, physical, or electronic memory device. The processing unit 230 is connected to the memory 235 and executes software that is capable of being stored in the RAM (e.g., during execution), the ROM (e.g., on a generally permanent basis), or another non-transitory computer readable medium such as another memory or a disc. Additionally or alternatively, the memory 235 is included in the processing unit 230. The controller 200 also includes an input/output ("I/O") system 240 that includes routines for transferring information between components within the controller 200 and other components of the water heater. For example, the I/O system communicates with the communications module 210 and the user interface 215.

Software included in the implementation of the water heater 100 is stored in the memory 235 of the controller 200. The software includes, for example, firmware, one or more applications, program data, one or more program modules, and other executable instructions. The controller 200 is configured to retrieve from memory and execute, among other things, instructions related to the control processes and methods described herein. For example, the controller 200 is configured to execute instructions retrieved from the memory 235 for controlling the heating elements 140 and 145 to heat the water to one or more set points based on one or more sensed temperatures of the temperature sensors 150 and 155 and further based on one or more commands and information via the user interface 215 and communication module 210.

The PCB also includes, among other things, a plurality of additional passive and active components such as resistors, capacitors, inductors, integrated circuits, converters, and amplifiers. These components are arranged and connected to provide a plurality of electrical functions to the PCB including, among other things, filtering, signal conditioning, signal converting, or voltage regulation. For descriptive purposes, the PCB and the electrical components populated on the PCB are collectively referred to as the controller 105.

The user interface 215 allows a user to interact with the controller 200 to control the operation of the water heater 100. The user interface 215 is operably coupled to the controller 200 to control, for example, the set point(s) of the water heater 100. The user interface 215 can include combination of digital and analog input devices required to input user-defined control for the water heater 100. For example, the user interface 215 can include an electronic-based device having a display, a touch-screen display, a plurality of knobs, dials, switches, buttons, faders, or the like.

The power supply module 205 supplies a plurality of nominal voltage to the various electrical components of the water heater. The power supply module 205 is powered by mains power having nominal line voltages between, for example, 100V and 240V AC and frequencies of approximately 50-60 Hz. The control of mains power to the heating elements 140 and 145 is via drivers 220 and 225, respectively. The drivers 220 and 225 may simply be respective relays receiving respective control signals from the controller 200. The power supply module 205 is also configured to supply lower voltages to operate circuits and components of the water heater 100, such as the controller 200, the communication module 210, and the user interface 215.

The communication module allows the controller 200 to communicate with the grid controller 30 or the house controller (collectively referred to as an external controller). For example, the controller 200 can receive commands and command information from the external controller. An exemplary communication module is a USNAP compatible device providing a demand response (DR) or home area network (HAN) solution for the water heater 100.

During a first (also referred to herein as "normal" or "full-load") operation of the water heater 100, both of the heating elements 140 and 145 (as well as any additional heating elements not shown) heat the water as is customary for the water heater 100. For example and discussed below, the grid controller 30 can provide commands to the water heater 100 that influences the operation of the water heater 100. The command can be a direct command to the water heater 100 or via a smart house controller. The first operation of the water heater 100 occurs when no command or a normal operation (or full-load) command is provided to the water heater 100 from the grid control 30. In normal operation, the water heater 100 can operate as if the water heater 100 would operate without being connected to the smart grid.

Before proceeding further, it should be understood that various adjectives or identifiers, such as normal, full load, reduced load, return load, and add load, are used throughout the description. The terms are used to better identify an operation of the water heater 100. It should be understood to someone skilled in the art that various synonyms can be used to in place of the identifiers used herein.

During normal or full-load operation, the upper and lower heating elements 145 and 140 are controlled based on the related temperatures from the upper and lower temperature sensors 155 and 150, respectively. If a value related to the sensed upper temperature traverses (i.e., is less than) a user set-point minus an upper differential, then the upper heating element 145 turns on. The upper differential may be zero, but is typically a value greater than zero to prevent significant on/off cycling of the heating element 145. One may also view the resulting temperature of the user set-point temperature minus an upper differential as a first set-point temperature. If the value related to the sensed upper temperature traverses (i.e., is greater than) the user set-point (which can be a identified as a second set-point) then the upper heating element 145 turns off.

Continuing further during full-load operation, if a value related to the sensed lower temperature traverses (i.e., is less than) the user set-point minus a lower differential, then the lower heating element 140 turns on. If the lower temperature traverses (i.e., is greater than) the user set-point or the upper heating element is on, then the lower element turns or is kept off.

As discussed already, the water heater 100, by itself or through a home energy system, may participate in a smart grid operation. For example, the home owner may participate in smart grid operation to receive a favorable energy rate from the electric utility. Alternatively, the home owner may be forced to participate in the smart grid operation or face a penalty.

Regardless, during a smart grid operation, the home owner may receive a "reduce-load" command (as referred to as a "shed-load" command). After receiving the reduce-load command, the controller 200 controls the lower heating element 140 to turn or be kept off. That is, the "reduce-load" command forces the lower heating element to turn off 140.

However, during the reduce-load command, the controller 200 operates the upper heating element 145, such as in normal operation. This way the water heater 100 continues to provide a limited amount of hot water while reducing the energy consumption of the water heater 100. That is, the stratification of the water in the storage tank allows a limited amount of hot water that is heated for the user, but the whole tank of water is not heated since the lower element 140 is not activated. The upper heating element may be referred to as the primary heating element or primary heat source, and the lower heating element may be referred to as the secondary heating element or secondary heat source.

Following a reduce-load command, the grid controller 30 may control the return of the water heaters 100 (or other loads) on the grid. For example, if all water heaters 100 being limited by the grid controller 30 return to normal operation at the same time, then a second overuse of the grid may occur. The grid controller 30 can communicate a "return-load" command (may also be referred to as an "end-shed-load" command). The return-load command controllably returns a large-number of water heaters among the many consumers 15.

One technique for returning a water heater 100 is through a "slot-control" method. In a slot-control method, a time period (e.g., one hour) is divided into slots (e.g., six slots). Each slot therefore has a slot time period (e.g., ten minutes when continuing the previous example). The grid controller 30 can communicate a ratio (e.g., in the form of a percentage or a decimal) to the various water heaters 100. For example, the grid controller 30 can communicate a return-load command at fifty percent to the water heater 100. Using this ratio, the water heater 100 can control the water heater 100 in a normal (or full-load) operation for half of the slots (referred to as the active slots) and use a reduce-load operation for the other half of the slots (referred to as the inactive slots). In one implementation, the active slots are continuous and the inactive slots are continuous within the time period.

The ratio information with the return-load command enables the energy in the lower portion of the tank 105 to heat over a shorter time. If the ratio command was not implemented, then all the tanks would see the return-load command at the same time and all heaters 100 would heat the lower portion at the same time causing a spike in power on the grid, therefore a time sequence method is used.

Further, the grid controller 30 will want to control how the active slots are distributed among the various water heaters 100. For example, if sixty water heaters 100 are being controlled, then the smart grid does not want all sixty water heaters 100 having their active and inactive slots being at the same time. Rather, the smart grid wants to try to distribute the active and inactive slots evenly. For example, the grid controller 30 will have ten water heaters 100 to first turn-on in slot one, ten water heaters to first turn-on in slot two, and so on. One way this is accomplished is for each water heater 100 to have a randomly assigned initial active slot. For example, each water heater can have a random number assigned between, and including, zero and five. The assigned number (e.g., two) identifies which slot should be the first active slot when receiving the return-load command. The random number may be assigned during manufacturing, power up, or upon receiving the return-load command. Since thousands, possibly millions, of water heaters 100 are coupled to the smart grid, the utilization of random numbers by the water heaters 100 statistically spreads the first active period among the various water heaters 100.

It also envisioned that the number of slots can be communicated from grid controller 30. For example, the grid controller 100 can communicate four slots and seventy-five percent with the return-load command. The controller 200 would then divide the time period into four slot time periods and randomly assign a first active slot from zero to three. If for example zero is assigned, then the first time slot will start the active period and then the active period would continue to the third time slot. The fourth time slot would then be the inactive period.

In some implementations, the water heater 100 acts in normal operation for the active time slots and operates in reduce-load operation for the inactive slots. With this operation, the grid controllably returns the water heaters 100 from a reduce-load state to a normal state.

The time period for return-load command, in some constructions, is between thirty and sixty minutes and the slot periods are between five and fifteen minutes. These time periods are used to extend relay life. It is also envisioned that both periods may be varied longer towards the end of the warranty period to extend relay life if the relay cycle timer is approaching the warranty limit. This should prolong the relay life to prevent premature failure of the relays.

A slight variation on the above slotted scheme is using the active time slots for the return-load command to stagger grid loading, but a relay is allowed to stay on until the temperature is satisfied. This will spread the grid load out somewhat, but not allow complete percent control. The result is to give the user better performance and limit the relay cycles.

Another command that the grid controller 30 can communicate with the water heater 100 is an "add-load" command. For this command, the water heater 100 adds a defined temperature (e.g., five degrees) to the set point. This results in the smart grid to store available energy in the water heater 100 by overheating the water. The overheating can be minimal (e.g., five degrees) such that the user does not notice the extra heating or can be larger (e.g., twenty degrees) such that a mixing valve is used to prevent scalding. Regardless, if the grid is under utilized, the grid can issue the add-load command to allow for available energy in the water tanks for later use when the grid is being burdened.

Thus, the invention provides, among other things, a new and useful water heater and method of operating a water heater. Various features and advantages of the invention are set forth in the following claims.

The invention claimed is:
1. A water heater comprising:
 a tank for holding water;
 a first heating element extending into the tank;
 a second heating element extending into the tank;
 a first temperature sensor thermally coupled to the water;
 a second temperature sensor thermally coupled to the water;
 a communication module operable to communicate with an external controller remote from the water heater; and
 a controller including a processor and a computer readable memory storing instructions that, when executed by the processor, cause the controller to
  determine a first temperature value related to a first temperature sensed by the first temperature sensor,
  determine a second temperature value related to a second temperature sensed by the second temperature sensor,
  receive a command from the external controller,
  when the received command is a first command, control current to the first heating element based on the first temperature value traversing a first set point, and
control current to the second heating element based on the second temperature value traversing a second set point,
when the received command is a second command,
control current only to the first heating element and not the second heating element, the control being based on the first temperature value;
when the received command is a third command indicative of available energy from an external grid system to store in the water heater, control current to the first heating element based on the first temperature value traversing a third set point, the third set point related to a user-controlled set point for the water heater plus an amount.

2. The water heater of claim 1, further comprising a mixing valve.

3. The water heater of claim 1 wherein the external controller is a smart grid controller.

4. The water heater of claim 1 wherein the external controller is a smart house controller.

5. The water heater of claim 1 wherein the first command is a full-load command for allowing the water heater to provide current using the first heating element and the second heating element, and wherein the second command is a reduced load command for allowing the water heater to provide current using only the first heating element and not the second heating element.

6. The water heater of claim 1 wherein the instructions, when executed by the processor, further cause the controller to, when the received command is a fourth command,
define a first time period,
define a second time period,
enter the first time period,
when in the first time period,
control current to the first heating element based on the first temperature value traversing the first set point, and
control current to the second heating element based on the second temperature value traversing the second set point,
enter the second time period, and
when in the second time period,
control current only to the first heating element and not the second heating element, the control being based on the first temperature value.

7. The water heater of claim 6 wherein the first command is a full-load command for allowing the water heater to provide current using the first heating element and the second heating element, wherein the second command is a reduced-load command for allowing the water heater to provide current using only the first heating element and not the second heating element, and wherein the fourth command is a return-load command for allowing, during the first time period, the water heater to provide current using the first heating element and the second heating element, and for allowing, during the second time period, allowing the water heater to provide current using only the first heating element and not the second heating element.

8. The water heater of claim 6 wherein the fourth command includes a ratio that defines a first length of time for the first time period relative to a second length of time for the second time period.

9. The water heater of claim 1, wherein the instructions, when executed by the processor, cause the controller to control current to the first heating element based on the first temperature traversing a first set point by
generating a signal resulting in current to flow to the first heating element when the temperature is less than the first set point, and
ceasing the signal resulting in current to not flow to the first heating element when the temperature is greater than a fourth set point.

10. The water heater of claim 9, wherein the first set point is a user-controlled set point minus an offset, and wherein the fourth set point is the user-controlled set point.

11. A method of operating a water heater to be placed at a consumer location and to be in communication with an external controller, the water heater including a tank for holding water, a first heating element extending into the tank, a second heating element extending into the tank, a first temperature sensor coupled to the tank, and a second temperature sensor coupled to the tank, the method comprising:
sensing a first temperature with the first temperature sensor;
determining a first temperature value related to the first temperature;
sensing a second temperature with the second temperature sensor;
determining a second temperature value related to the second temperature;
receiving a command from the external controller;
when the received command is a first command,
controlling current to the first heating element based on the first temperature value traversing a first set point, and
controlling current to the second heating element based on the second temperature value traversing a second set point;
when the received command is a second command,
controlling current only to the first heating element and not the second heating element, the controlling being based on the first temperature value; and
when the received command is a third command indicative of available energy from an external grid system to store in the water heater, controlling current to the first heating element based on the first temperature value traversing a third set point, the third set point related to a user-controlled set point for the water heater plus an amount.

12. The method of claim 11 wherein the water heater further includes a mixing valve.

13. The method of claim 11 wherein the external controller is a smart grid controller.

14. The method of claim 11 wherein the external controller is a smart house controller.

15. The method of claim 11 wherein the first command is a full-load command for allowing the water heater to provide current using the first heating element and the second heating element, and wherein the second command is a reduced-load command for allowing the water heater to provide current using only the first heating element and not the second heating element.

16. The method of claim 11 and further comprising, when the received command is a fourth command,
defining a first time period,
defining a second time period,
entering the first time period;
when in the first time period,
controlling current to the first heating element based on the first temperature value traversing the first set point, and controlling current to the second heating element based on the second temperature value traversing the second set point;

entering the second time period; and when in the second time period, controlling current only to the first heating element and not the second heating element, the controlling being based on the first temperature value.

17. The method of claim 16 wherein the first command is a full-load command for allowing the water heater to provide current using the first heating element and the second heating element, wherein the second command is a reduced-load command for allowing the water heater to provide current using only the first heating element and not the second heating element, and wherein the fourth command is a return-load command for allowing, during the first time period, the water heater to provide current using the first heating element and the second heating element, and for allowing, during the second time period, the water heater to provide current using only the first heating element and not the second heating element.

18. The method of claim 17 wherein the fourth command includes a ratio that defines a first length of time for the first time period relative to a second length of time for the second time period.

19. The method of claim 11 wherein the step of controlling current to the first heating element based on the first temperature traversing a first set point includes generating a signal resulting in current to flow to the first heating element when the temperature is less than the first set point, and ceasing the signal resulting in current to not flow to the first heating element when the temperature is greater than a fourth set point.

20. The method of claim 19, wherein the first set point is a user-controlled set point minus an offset, and wherein the fourth set point is the user-controlled set point.

* * * * *